United States Patent
Myers et al.

(10) Patent No.: US 9,367,515 B1
(45) Date of Patent: Jun. 14, 2016

(54) MANAGING ADAPTIVE REBOOTS ON MULTIPLE STORAGE PROCESSORS

(71) Applicant: EMC Corporation, Hopkinton, MA (US)

(72) Inventors: Jackson Brandon Myers, Cary, NC (US); Victor T. Kan, Morrisville, NC (US); Eric R. Vook, Durham, NC (US); Abhaya Pattanaik, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 349 days.

(21) Appl. No.: 14/144,780

(22) Filed: Dec. 31, 2013

(51) Int. Cl.
  *G06F 15/177* (2006.01)
  *G06F 1/32* (2006.01)

(52) U.S. Cl.
  CPC ............ *G06F 15/177* (2013.01); *G06F 1/3246* (2013.01)

(58) Field of Classification Search
  None
  See application file for complete search history.

(56) References Cited

U.S. PATENT DOCUMENTS

| 2003/0051127 | A1* | 3/2003 | Miwa | G06F 9/4406 713/2 |
| 2006/0236150 | A1* | 10/2006 | Lintz | G06F 11/1417 714/6.13 |
| 2012/0005468 | A1* | 1/2012 | Yu | G06F 11/1417 713/2 |

* cited by examiner

*Primary Examiner* — Kim Huynh
*Assistant Examiner* — Vincent Chang
(74) *Attorney, Agent, or Firm* — John T. Hurley; Jason A. Reyes; Krishnendu Gupta

(57) ABSTRACT

A technique for managing a boot process on a data storage system having multiple storage processors is disclosed. A first storage processor communicatively coupled to and directs a second storage processor to perform one or more boot sequences. Elapsed time and timeout variables and an empty set of boot states are provided. After sleeping for a predetermined time the elapsed time variable is incremented. If the boot state of the second processor is not successful, the technique determines if the current boot state is a new boot state, and if so, the new boot state is added to the set of boot states and the elapsed time value is reset. The timeout value is set equal to the user defined value. If the elapsed time is less than the timeout value, the technique loops back to the sleep state and continues thereon, else if greater that the timeout value, a failure is indicated.

18 Claims, 8 Drawing Sheets

| STATE A | INITIAL BOOT STATE |
|---------|--------------------|
| STATE B |                    |
| STATE C |                    |
| STATE D | LONGER STATE       |
| STATE E |                    |
| STATE F | FINAL STATE (SUCCESS) |

FIG. 5

| STATE A | INITIAL BOOT STATE |
|---------|---------------------|
| STATE B | |
| STATE C | TRIGGERS REBOOT |
| STATE A | SECOND BOOT |
| STATE B | |
| STATE C | NO REBOOT NEEDED THIS TIME |
| STATE D | LONGER STATE |
| STATE E | |
| STATE F | FINAL STATE (SUCCESS) |

FIG. 6

| | |
|---|---|
| STATE A | INITIAL BOOT STATE |
| STATE B | SYSTEM GETS STUCK<br><br>(CURRENT TECHNIQUE STOPS MUCH EARLIER)<br><br><br><br>(CONVENTIONAL METHOD STOPS MUCH LATER) |

FIG. 7

| STATE A | INITIAL BOOT STATE |
|---------|--------------------|
| STATE B |                    |
| STATE C | TRIGGERS REBOOT    |
| STATE A | SECOND BOOT        |
| STATE B |                    |
| STATE C | TRIGGERS BOOT      |
| STATE A | THIRD BOOT         |
| STATE B |                    |
| STATE C | TRIGGERS BOOT      |

FIG. 8

MANAGING ADAPTIVE REBOOTS ON MULTIPLE STORAGE PROCESSORS

BACKGROUND

1. Technical Field

This application relates generally to managing adaptive reboots on data storage systems having multiple storage processors.

2. Description of Related Art

At present, network environments comprising hardware platform machines execute software applications to perform various network functions, such as data management and storage. After the initial installation, a software application may require an update or revision in order to remedy any existing software errors or to increase, update, or otherwise change the hardware platform's performance. Thus, an updated version of the installed software application must be generated by the software provider and deployed to hardware platforms on a regular basis.

Delivery of the software typically consists of uploading the new software to the data storage system, installing the software on each of the storage processors, and rebooting each storage processor in sequence. Installation and reboots must be timed in such a way that at least one storage processor is available to process host I/O at any given time. Each storage processor must monitor the reboot of other storage processors to ensure that reboots do not overlap, and so that failures are reported to the user as soon as possible. A reboot of a storage processor creates a window of vulnerability, where a failure on the other storage processor leaves neither storage processor able to handle host I/O.

SUMMARY OF THE INVENTION

A technique for managing a boot process on a data storage system having multiple storage processors is disclosed. A first storage processor communicatively coupled to and directs a second storage processor to perform one or more boot sequences. Elapsed time and timeout variables and an empty set of boot states are provided. After sleeping for a predetermined time the elapsed time variable is incremented. If the boot state of the second processor is not the terminal, and therefore successful, boot state, the technique determines if the current boot state is a new boot state, and if so, the new boot state is added to the set of boot states and the elapsed time value is reset. The timeout value is set equal to the user defined value. If the elapsed time is less than the timeout value, the technique loops back to the sleep state and continues thereon, else if greater that the timeout value, a failure is indicated.

BRIEF DESCRIPTION OF THE DRAWINGS

Features and advantages of the present invention will become more apparent from the following detailed description of exemplary embodiments thereof taken in conjunction with the accompanying drawings in which:

FIGS. 5-8 are state tables listing state conditions according to embodiments of the system described herein.

DETAILED DESCRIPTION OF EMBODIMENT(S)

In a two computer system, where one computer is upgraded and rebooted at a time, each computer needs to monitor the reboot of the peer computer, and report back failures to the user if the reboot does not complete in a timely manner so that the user can take corrective action. The techniques presented herein allow for each computer to use a bus or other such communication medium to share boot state information with the peer computer. The monitoring computer maintains a set of boot states that have been seen on the rebooting computer. When a new state is encountered, a timer is reset. If no new states are seen during the timeout period, even if the boot states are changing, then the monitoring computer will consider the reboot to be a failure.

Figure 1:
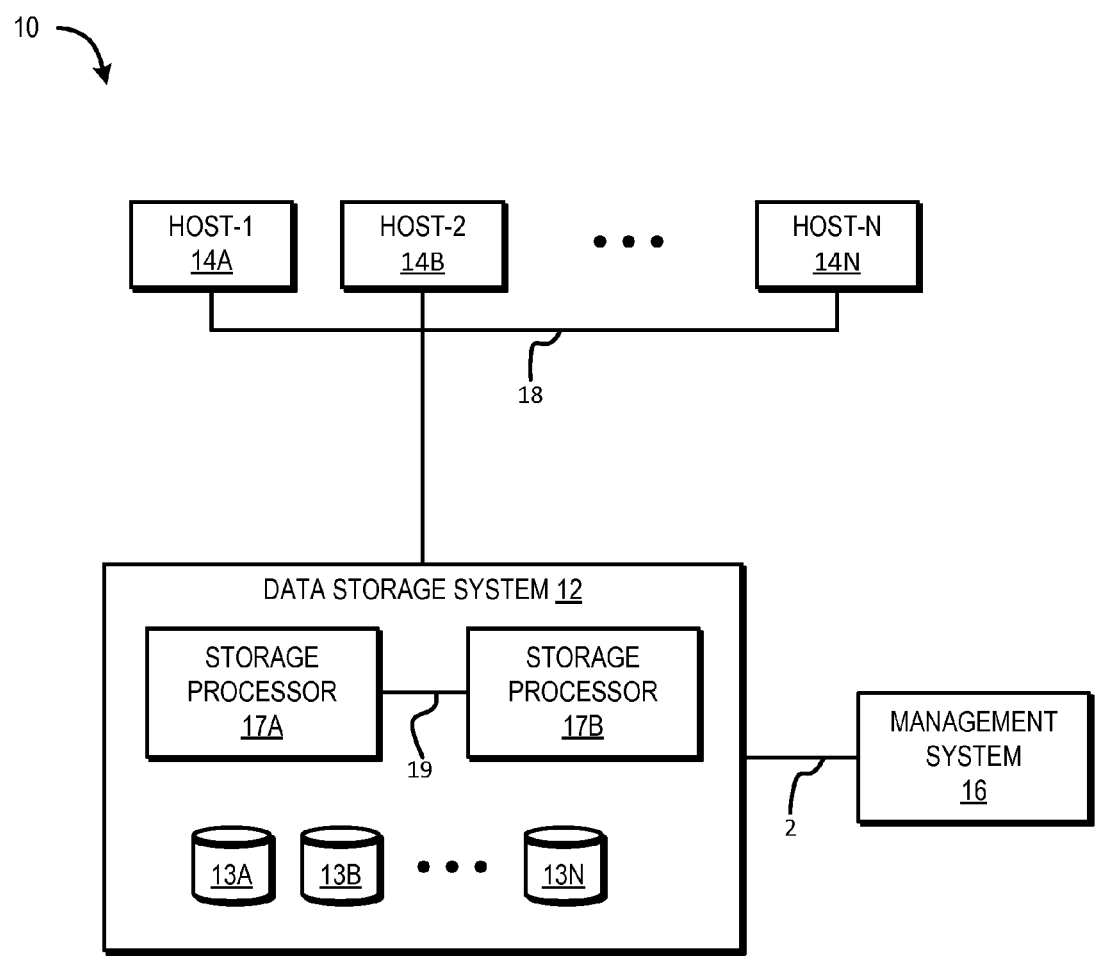
FIG. 1 is an example embodiment of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a 14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a 14n may access and communicate with the data storage systems 12, and may also communicate with other components (not shown) that may be included in the system 10. In one embodiment, the communication medium 2 may be a LAN connection and the communication medium 18 may be an iSCSI, Fibre Channel, Serial Attached SCSI, or Fibre Channel over Ethernet connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

The data storage system may be a single unitary data storage system, such as single data storage array, including two storage processors or compute processing units. Techniques herein may be more generally use in connection with any one or more data storage system each including a different number of storage processors than as illustrated herein. The data storage system 12 may be a data storage array, such as a VNX® data storage array by EMC Corporation of Hopkinton, Mass., including a plurality of data storage devices 13a-13n and two storage processors 17a, 17b. The storage processors 17a, 17b may include a central processing unit (CPU) and memory and ports (not shown) for communicating with one or more physical or virtual hosts 14A-14N. The storage processor may be communicatively coupled via a communication medium such as storage processor bus 19. The storage processor units may be included in the data storage system 12 for processing requests and commands. In connection with performing techniques herein, an embodiment of the data storage system may include multiple storage processors including more than two storage processors as described. The VNX® data storage system mentioned above may include two storage processors 17a, 17b for performing processing in connection with servicing requests. Additionally, the two storage processors 17a, 17b may be used in connection with failover processing when communicating with the management system 16. Client software on the management system 16 may be used in connection with performing data storage system management by issuing commands to the data storage system 12 and/or receiving responses from the data storage system 12 over connection 2. In one embodiment, the management system 16 may be a laptop or desktop computer system.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Figure 2:
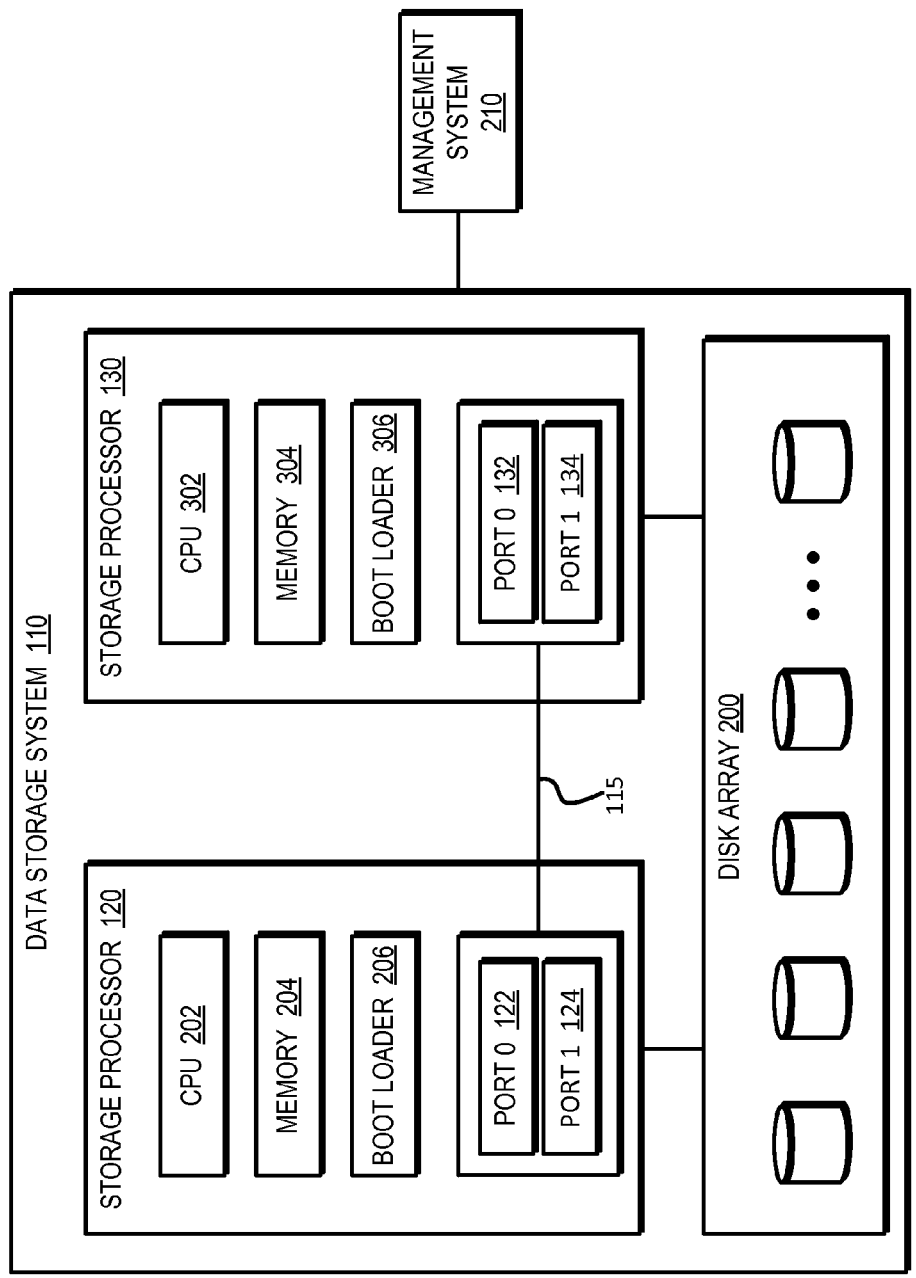
FIG. 2 is a block diagram of a system in further detail that may utilize the techniques described herein.

FIG. 2 is a schematic illustration of a data storage system 110 including two peer storage processors (e.g., storage processor boards): storage processor A (SPA) 120 and storage processor B (SPB) 130. According to an embodiment of the system described herein, SPA 120 and SPB 130 may be contained within the data storage system 110 and may be coupled to one or more disk arrays 200 or similar storage devices controlled by one or more of the SPs 120, 130. Each of the SPs 120, 130 may include one or more ports, for example, two Ethernet ports that communicate using TCP/IP. The SPA 120 may have a Port0 122 and a Port1 124 while the SPB 130 may have a Port0 132 and a Port1 134. As illustrated, the Port1 124 on the SPA 120 is connected to the Port1 134 on the SPB 130 via a connection 115. In various embodiments, the connection may be a cross-over Ethernet cable and/or one or both of the Port1s 124, 134 may utilize auto-sensing capabilities with any suitable cable. The Port1 124 on the SPA 120 may have a static Internet Protocol (IP) address assigned thereto that is different from another static IP address assigned to the Port1 134 on the SPB 130. Alternatively, the ports may obtain a dynamic IP address using, for example, DHCP. It should be noted that although the illustrated embodiment shows two ports on each processor that may be used as service and/or management ports, the system described herein may operate with only one port on each processor or may operate with more than two ports on each processor. Furthermore, the storage processors may also be connected by and communicate through an inter-integrated circuit ($I^2C$) or other type of bus.

The SPA 120 may include a CPU 202, memory 204, and boot loader system 206, among other components. The CPU 202, memory 204 and the boot loader system 206 may be coupled together as separate modules and/or incorporated into one module. The CPU 202 may be one or more microprocessors, e.g., INTEL® multi-core processors that control operations of the SPA 120, including accessing the memory 204, e.g., volatile memory, which may include random access memory (RAM), flash memory and/or other suitable memory. The boot loader system 206, such as a basic input/output system (BIOS), may be included as part of firmware code, embedded on a computer read-only memory (ROM), included in flash memory and/or included as part of some other software or hardware system that allows the storage processor to obtain and process an upgrade package.

The SPA 120 may be coupled to a disk array 200, which represents any appropriate storage systems/devices. The disk array 200 may be contained within the storage system 110 and/or disposed externally to the storage system 110. The SPA 120 may also be coupled to a user management system 210, including one or more software programs such as a UNISPHERE® management system, for example, produced by EMC Corporation of Hopkinton, Mass., that allows management of the storage processors 120, 130 and/or the entire storage system. The management system 210 may also include hardware and/or software products accessible via a network, such as an intranet and/or the Internet. The SPA 120 may include one or more network interface cards (NICs).

The SPA 120 may be coupled to an external processing device, such as host 14A-14N, that may include one or more servers, as discussed herein. The external processing device may include a dynamic host configuration protocol (DHCP) server that may supply an IP address when requested and may also include a server with memory containing files that may be downloaded to the storage processor, the SPB 130, in connection with requesting upgrade. The DHCP server may be the same server as or different server from the server. The external processing device may be incorporated as part of the SPA 120 and/or may be located separately from, and accessed by, the SPA 120. For example, the external processing device may be accessed by the SPA 120 using a network, such as an intranet and/or the Internet. Alternatively, for example, the SPA 120 may include a server incorporated therein and the DHCP server may be coupled to, but located separately from, the SPA 120.

The SPB 130 may be similarly configured with similar components and couplings as described herein with respect to the SPA 120. The SPB 130 may include a controller 302, a memory 304, and a boot loader 306. The SPB 130 may be coupled to an interface 310 and an external processing device 320. As further discussed elsewhere herein, the external processing device may be separate from the SPB 130 or incorporated as part of the SPB 130. Similarly, the management system 210 may be same or different than the management system 210 associated with SPA 120. The SPB 130 may operate as a primary storage processor, as described herein, with respect to the SPA 120 in the event that the SPA 120 requires it to do so. The SPB 130 may be coupled to a disk array 200 (representing any appropriate storage systems/devices) contained within the storage system 110 and/or disposed externally to the storage system 110. Note that the disk array 200 coupled to the SPB 130 may be the same as or different from the disk array 200 coupled to the SPA 120.

Each SP 120, 130 includes an operating system (OS) that may include several components which assist in the functioning and operation of the storage processor. For instance, the OS may include a computing environment application which assists with the data storage operations performed by SPs 120, 130. Occasionally, software requires updating in order to optimally perform or accommodate new hardware and software components installed in storage processors 120, 130. For example, updating may be required if a network operator desires storage processors 120, 130 to utilize recent revisions of an application, or recent revisions of specific driver components utilized by an application.

In one embodiment, the storage processor 120 (which may be designated as the "primary" storage processor in a redundancy configuration) may obtain updates by downloading revised software from one or more hosts that are associated with the original producer of the software program to be updated. For example, a host may be configured to maintain a plurality of software bundles containing software updates in a software bundle storage area. As used herein, the term "software bundle" is defined as a collection of software packages bundled together for convenient delivery (e.g., download) to a client's machine. Similarly, a "software package" is a grouping of software drivers, programs, or files that are intended to update a software program running on a client computer, such as storage processor 120. The Software bundle storage area may be embodied by any data storage means used to store one or more versions of software bundles that are accessible to client machines.

Figure 3:
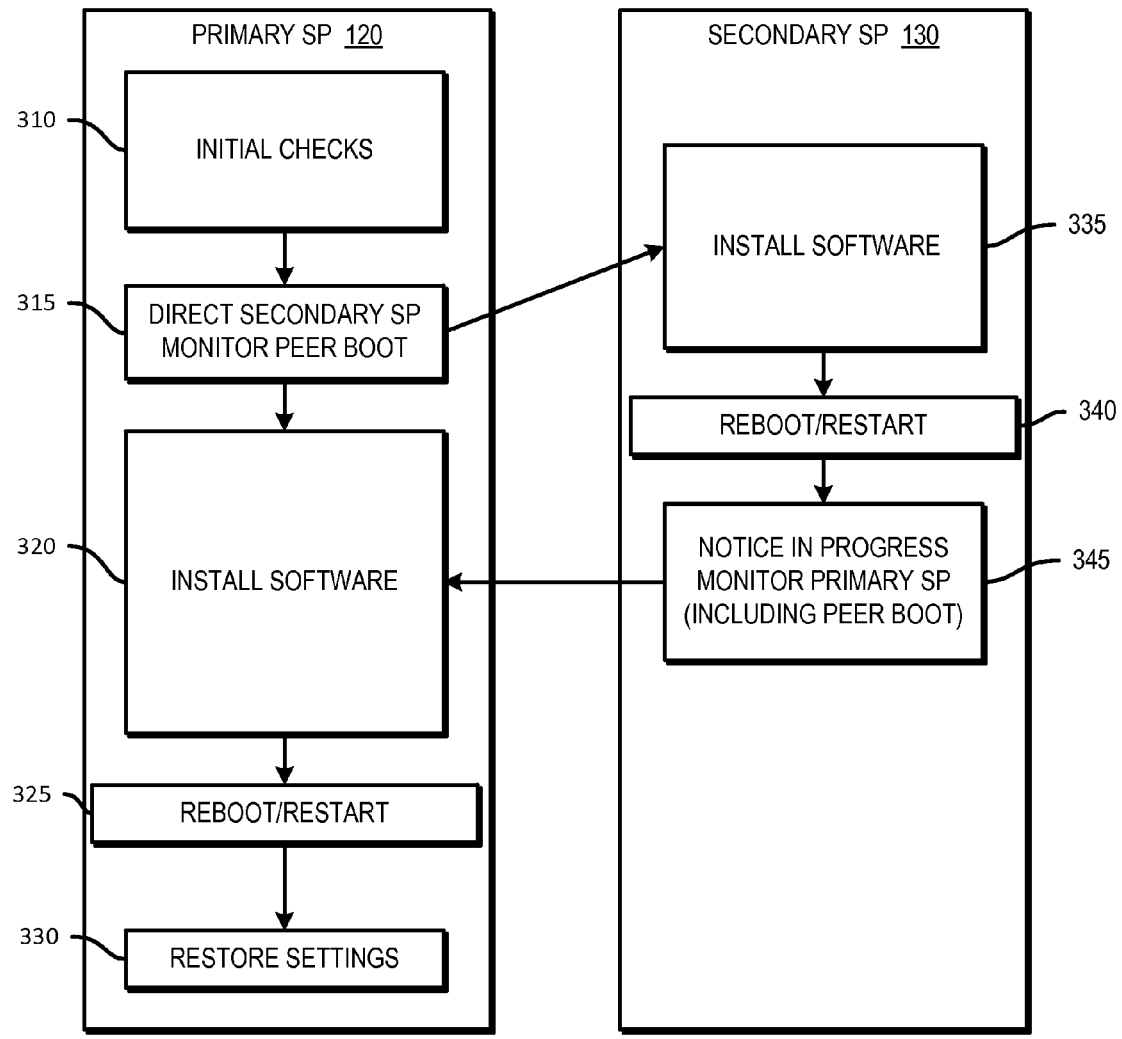
FIG. 3 is a block diagram of system components that may utilize the techniques described herein.

FIG. 3 illustrates an example embodiment of peer storage processors 120, 130 undergoing a non-disruptive upgrade where one or more boot sequences may be executed. In the example, one storage processor operates as a primary SP 120 and the other storage processor operates as a secondary SP 130. The various steps or segments are grouped together as instruction blocks for convenience of discussion; however, the particular order and grouping of the various steps or instructions should not be construed as being limited as such, and may vary in number, type, and/or order. Further, the states shown are not a complete list as many other states are possible.

The non-disruptive upgrade procedure may begin with a first instruction block 310 comprising steps to be performed on the primary SP 120. For example, the steps performed may be represented as instructions to check the validity of the software upgrade. At block 315, the primary SP 120 directs the peer secondary SP 130 to execute a number of instructions which may include one or more reboot sequences. The primary SP 120 may be configured to monitor secondary SP 130 states as the secondary SP 130 executes various steps associated with the upgrade procedure. For example, at block 335, the secondary SP 130 may perform steps such as copying files or updating system settings. At this point, at block 340, the secondary SP 130 may be directed to perform a reboot or restart sequence. After successful completion of the reboot sequence 340, the upgrade procedure proceeds to block 345 where additional instructions may be performed after which, the secondary SP 130 is configured to monitor the primary SP 120 and sequence flow is redirected back to the primary SP 120. At instruction block 320, the primary SP 120 continues executing any remaining operations such as copying files and updating system settings. At instruction block 325, the primary SP 120 may be instructed to perform a reboot sequence. After a successful reboot, the primary SP 120 may restore appropriate settings after which the non-disruptive upgrade procedure is complete.

There are situations where the upgrade procedure can fail such as when a process or reboot hangs, a sequence of steps gets stuck in an endless reboot loop, and the like. To prevent an SP from remaining in this state indefinitely, conventional methods employ a timeout such that if the upgrade process fails in this manner, control will revert back to the peer storage processor after the timeout period has expired. The timeout value is typically chosen as an implementation compromise where it is greater than a value so as to not stop an upgrade procedure that is still operating properly and less that a value that is much longer that the longest average upgrade time. That is, the timeout is chosen to be longer than the average worst case upgrade but not so long that the system remains stuck longer than reasonably necessary. For example, a one hour timeout may be chosen for each SP such that if the upgrade does not compete with in one hour, control will return to the peer SP. Exceeding this timeout typically indicates that the peer SP is in a reboot loop, will never return back to service, and the upgrade should fail. In conventional methods, the timeout is a static, fixed value.

In addition, as current data storage system functionality and complexity increases, the number of reboots required during an upgrade as well as the amount of work that must be done has been increased dramatically. Firmware updates, hotfixes, flexports, and iSCSI port configuration can all consume time as well as require additional reboots.

Conventionally, the typical method would be to simply increase the timeout value to a large enough amount of time to cover the longest state, for example, two hours. However, such a large value greatly increases the vulnerability of a system to data unavailable errors during a non-disruptive upgrade because the primary SP needs to know as soon as possible that the reboot of the peer has failed before recovery can begin. Until the secondary SP has been recovered, only the primary SP is processing I/O, so a single SP failure can cause data unavailable errors.

By contrast, as will be described in more detail below, techniques presented herein enable the implementation of adaptive reboot timeouts. Example embodiments include providing a mechanism to monitor upgrade or boot states and add each new stat to a set of states. When a new state (i.e., never seen on this reboot attempt) is encountered, the elapsed time gets set to 0 (in addition, or alternatively, true elapsed time may also be stored). As the elapsed time keeps getting reset each time a new state is encountered, the actual timeout value may be significantly reduced, for example, from 1 hour down to 30 minutes, even though the total upgrade time may take more than 1 hour. New states may be created for parts of the reboot process which take a significant amount of time, such as, for example, virtual port creation, sync operations, and iSCSI discovery. In addition, or alternatively, the timeout value may be dynamically adjustable. For example, a registry setting, configuration file value, or other such way of having a value that can be modified without re-compiling the code may be used to store the timeout value such that it can be checked inside a reboot timer loop so that manual changes to the setting made during an upgrade are noticed immediately. If the elapsed time is greater than the current timeout value, then the code will declare the reboot to be a failure. The current poll count, poll maximum values and log times may be logged. As a result, boot failures are identified much sooner while additionally providing the ability to allow reboot sequences that exceed conventional timeout values (e.g., two hours) in cases where the monitoring/feedback mechanism determines that a reboot is continuing to make progress (i.e., encountering new states).

Figure 4:
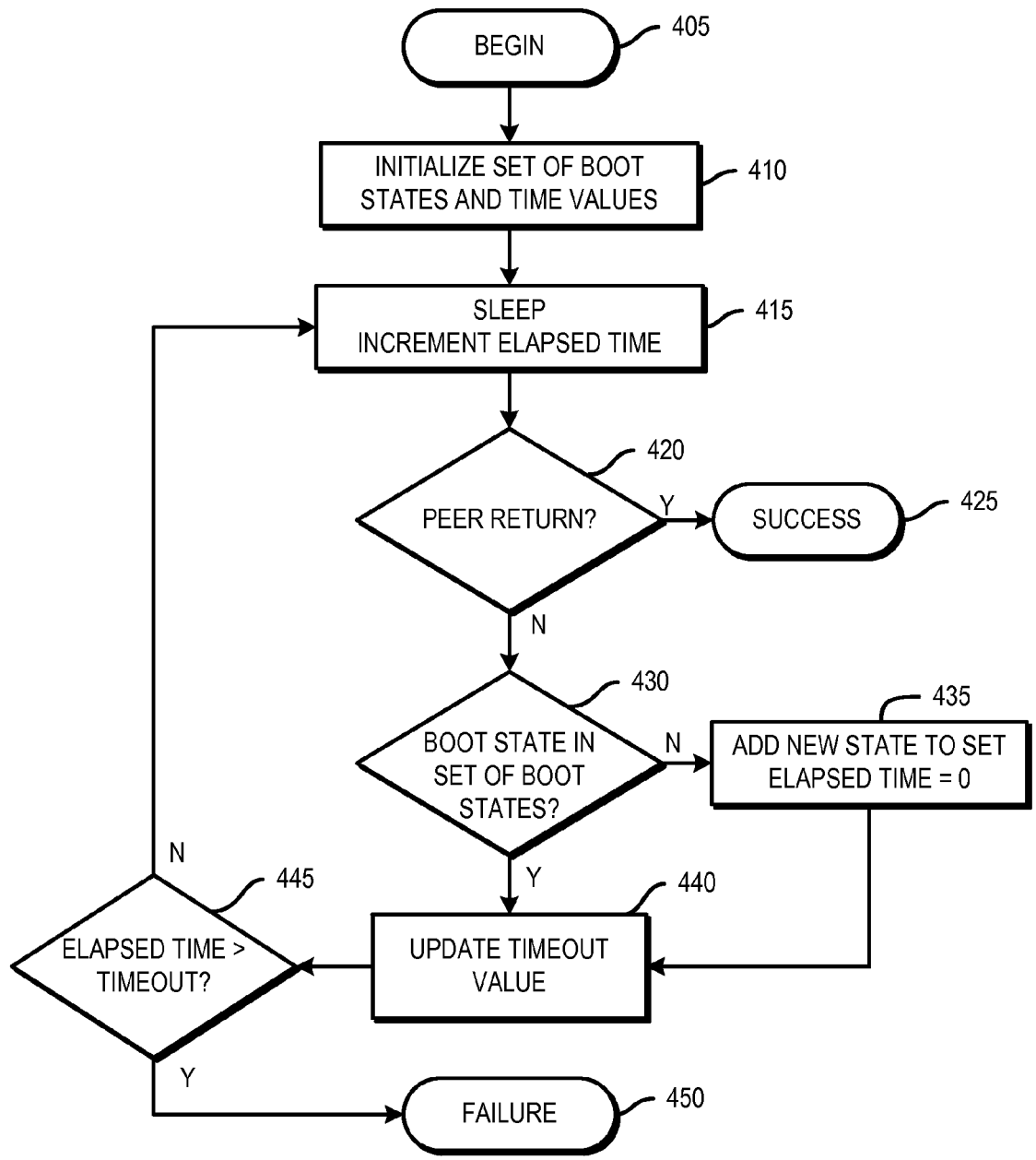
FIG. 4 is a flowchart of a method that may utilize the techniques described herein.

FIG. 4 is a flow diagram that illustrates an example method for use in implementing adaptive reboot timeouts. While various methods disclosed herein are shown in relation to a flowchart or flowcharts, it should be noted that any ordering of method steps implied by such flowcharts or the description thereof is not to be construed as limiting the method to performing the steps, or sub-steps within or among the steps, in that order. Rather, the various steps of each of the methods disclosed herein can be performed in any of a variety of sequences. In addition, as the illustrated flowcharts are merely example embodiments, various other methods that include additional steps or include fewer steps than illustrated are also within the scope of the present invention.

As shown, the method can begin at step 405. The method can be initiated manually by a user, for example, by clicking on a button or other object in a graphical user interface (GUI) on the mobile computing device or by entering a command in a command-line-interface. Execution of the method can also be based on various user-specified parameters. For example, a user can specify an effective sample rate and timeout value.

At step 410, a set of boot states and time values (e.g., elapsed time and reboot timeout) are initialized. The reboot timeout value may be based on a modifiable setting (e.g. registry setting or configuration file value) that can override existing static values, such as a #define value. Such an approach allows the timeout value to be adjusted by a user as desired. This mechanism allows for the situation where a particular upgrade or reboot is taking an unexpectedly long time but the user determines is proceeding properly. In this case, the user may increase the timeout value to allow the process to continue to execute. This may also provide an additional diagnostic and debug tool for service and factory support personnel.

At step 415, the method may be directed to sleep for a fixed wait interval, after which, the elapsed time value is incremented. At step 420, a check is made to determine if the peer SP has returned, that is, if the upgrade reboot process has completed as expected, and if so, the method proceeds to step 425 indicating success, and the upgrade process proceeds as appropriate. If the peer SP does not return successfully, the method proceeds to step 430 where a check is made to determine if the current boot state (i.e., the most recently encountered state) is in the current list of boot states. If the boot state in not in the set of boot states, the method proceeds to step 435 where the new state is added to the set of boot states. As a newly encountered boot state indicates that the boot sequence is proceeding, the elapsed time is reset to zero. Alternatively, or in addition, the total elapsed time may also be stored. However, if at step 430 it is determined that the current boot state is not in the current list of boot states, the timeout is set equal to a value stored in the associated modifiable value.

The method then proceeds to step 445 where a determination is made to see if the elapsed time is greater than the current timeout value, and if so, the boot sequence is failed and an indicator may be provided back to the monitoring SP indicating as much. This may be the situation where no new states are encountered, in which case, the boot state is most likely stuck in a boot loop. If at step 445, a determination is made that the elapsed time is less than the current timeout value, the method proceeds back to step 415 and proceeds back through the remaining steps as appropriate in a manner as was described above.

Thus, in an example embodiment, a method for managing a boot process on a data storage system having multiple storage processors may be implemented employing the techniques described herein. The technique may include, for example, (a) providing a first storage processor and a second storage processor of a data storage system, the first storage processor communicatively coupled to the second storage processor, wherein the first storage processor directs the second storage processor to perform one or more boot sequences; (b) providing an elapsed time variable, timeout variable, and an empty set of boot states; (c) sleeping for a predetermined sleep time interval and incrementing the elapsed time variable; (d) stopping if the boot state of the second processor executes successfully; (e) monitoring a current boot state performed by the second processor during the boot sequence and determining if the current boot state is a new boot state, wherein a new boot state is a boot state not in the set of boot states; (h) if the current boot state is a new boot state, adding the new boot state to the set of boot states and resetting the elapsed time value; (g) setting the timeout value equal to the user defined value; and (h) if the elapsed time is less than the timeout value, looping back to step (c), else if the elapsed time is greater that the timeout value, indicating a failure.

Alternative example embodiments may further include setting the timeout variable to a predetermined value. The timeout variable may be associated with a user definable variable such as a registry value or configuration file value that can be dynamically adjusted by a user or system process. The sleep time interval may be associated with a sampling rate at which the boot states are monitored and may be a static value or adjusted by a user of system process. The second storage processor boot state status may be indicated or otherwise reported to the first storage processor. The first storage processor may be configured as a primary storage processor and the second storage processor may be configured as a secondary storage processor. Alternatively, or in addition, the second storage processor may be configured as a primary storage processor and the first storage processor may be configured as a secondary storage processor. Further embodiments may include categorizing boot states according to execution time and creating sub-states from one or more of states that exceed a predetermined execution time allowing use of an even smaller timeout value if so desired.

FIGS. 5-8 depict a set of states illustrating a variety of successful and failed boot sequences. Example states include memory check, POST loading, operating system load, Flare driver entry, and user space applications starting, among numerous other states. For simplicity of illustration and discussion, a particular boot state is represented by alphanumeric letter. Blank state descriptions may include any appropriate state encountered during a boot process.

FIG. 5 illustrates a set of boot states reflective of a simplified successful boot process according to an example embodiment of the techniques described herein. In this scenario, the upgrade begins at State A with an initial boot state. The sequence proceeds with States B and C. State D represents a longer State (i.e., takes a longer time to execute) and then State E is executed. The sequence executes State F which is indicative of a final, successful boot state. In this case, each state was newly encountered, therefore, each state was added to the set of states and elapsed time was subsequently reset to zero, and as such, the elapsed time never exceeded the timeout value.

FIG. 6 illustrates a successful boot sequence wherein a second reboot is performed. Here, the sequence begins at State A with an initial boot state. State B is executed, and then at State C, a reboot is triggered. A second reboot can be a common occurrence during a typical upgrade procedure. After the reboot is performed, the sequence begins again by executing States A, B and C. The second execution of State C did not require a reboot, therefore, the sequence proceeds to State D, which may be a longer state but still executes in a time period (i.e., elapsed time) that is less the current timeout value. State E is executed and then State F is performed at which point the monitoring mechanism declares the procedure successful. In this scenario, the timeout can be set to be sufficiently long enough to allow the longest state, State D, to complete. Alternatively, or in addition, State D may be broken up into sub-States, thereby allowing an even shorter timeout value. By contrast, conventional methods require a timeout to be at least long as the entire process, including all States and all subsequent reboots (i.e., States A, B, C, A, B, C, D, E, F).

FIG. 7 represents a simple failed boot sequence. In this scenario, the sequence similarly begins at State A with an initial boot state. During State B, an error is encountered causing the sequence get stuck preventing any further progress. As no new states are encountered, the timeout value is eventually exceeded and the monitor mechanism determines that the boot sequence failed. Control is then returned to the peer SP. As a result, the current technique can recognize a failure much earlier and return control back to the peer SP much earlier. By contrast, conventional methods cannot recognize a failed boot state and must wait until their much longer timeout period is exceeded, thereby taking a significantly longer time to return control to the peer SP. As a result, conventional methods result in an increased risk of data unavailability due to reliance on a single SP during the longer timeout period.

FIG. 8 depicts a failed boot sequence where the failure occurs as a result of the non-disruptive upgrade getting stuck in, for example, a reboot loop. Here, the sequence begins at State A with an initial boot state. State B is executed, and then at State C, a reboot is triggered. After the reboot is performed, the sequence begins again repeating States A, B and C. The second execution of State C performs another reboot, thereby, repeating States A, B and C again. After the second reboot is performed, the sequence again repeats States A, B and C. The third execution of State C performs another reboot, repeating States A, B and C again. At this point, the monitor mechanism determines that the sequence is stuck in an infinite reboot loop. Thus, because no new boot states were encountered after the initial execution of States A, B, and C, the elapsed time eventually exceeded the timeout value, thereby indicating a failed boot sequence. In other words, in this example, only States A, B and C are added to the set of boot states. As indicated in steps 440 and 445 of FIG. 4, the elapse time will eventually exceed the timeout and the monitor mechanism will fail the sequence, and return control to the peer SP. Note, however, that even though three boot loops are executed before a failure is identified/indicated, the time in which the failure is detected can be much less than conventional methods as it is determined within the much lower timeout value. However, there may be situations where it is desirable to allow the process to continue, such as for debug purposes or the situation where a particular configuration may be expected to take significantly longer. In these cases, the modifiable value associated with the timeout can be increased (e.g., 2 hours) such that the sequence will run longer than that of conventional methods. Similarly, it may be desirable to fail a particular sequence sooner that would be the case, such as during debug situations. Here, the modifiable value associated with the timeout value can be decreased causing a failure to be indicated sooner that would be the case otherwise.

Thus, employing the techniques described herein allow the implementation of adaptive reboot timeouts during non-disruptive upgrades performed on multiprocessor systems. Timeout values are typically much shorter than those used with conventional methods as well as being dynamically adjustable by a user and/or system processes. In addition, the timeout may be adapted for situations where various timeout values are desired, including values longer than conventional values. As a result, failures are detected earlier and because timeout values are reduced, the risk of a data unavailable error is significantly reduced. The technique is also a valuable tool for debug and maintenance purposes.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), Flash memory, an optical fiber, a portable compact disc read-only memory (CD-ROM), an optical storage device, digital versatile disc ROM (DVD-ROM) a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for managing a boot process on a data storage system having multiple storage processors, the method comprising:
   (a) providing a first storage processor and a second storage processor of a data storage system, the first storage processor communicatively coupled to the second storage processor, wherein the first storage processor directs the second storage processor to perform one or more boot sequences;
   (b) providing an elapsed time variable, timeout variable, and an empty set of boot states;
   (c) sleeping for a predetermined sleep time interval and incrementing the elapsed time variable;
   (d) if the boot state of the second processor executes successfully stop, else continue;
   (e) monitoring a current boot state performed by the second processor during the boot sequence and determining if the current boot state is a new boot state, wherein a new boot state is a boot state not in the set of boot states;
   (f) categorizing boot states according to execution time and creating sub-states from one or more boot states that exceed a predetermined execution time;
   (g) if the current boot state is a new boot state, adding the new boot state to the set of boot states and resetting the elapsed time value;
   (h) setting the timeout value equal to a user defined value; and
   (i) if the elapsed time is less than the timeout value, looping back to step (c), else if the elapsed time is greater that the timeout value, indicating a failure.

2. The method of claim 1, wherein the timeout variable is set to a predetermined value.

3. The method of claim 1, wherein the timeout variable is associated with a modifiable value.

4. The method of claim 1, wherein the timeout is a user definable variable that is dynamically modifiable by the user.

5. The method of claim 1, wherein the sleep time interval is associated with a sampling rate at which the boot states are monitored.

6. The method of claim 1, further including reporting a second storage processor boot state status to the first storage processor.

7. The method of claim 1, wherein the first storage processor is configured as a primary storage processor and the second storage processor is configured as a secondary storage processor.

8. The method of claim 1, wherein the second storage processor is configured as a primary storage processor and the first storage processor is configured as a secondary storage processor.

9. A system for managing a boot process on a data storage system having multiple storage processors, the system comprising at least two storage processors configured to:
   (a) provide a first storage processor and a second storage processor of a data storage system, the first storage processor communicatively coupled to the second storage processor, wherein the first storage processor directs the second storage processor to perform one or more boot sequences;
   (b) provide an elapsed time variable, timeout variable, and an empty set of boot states;
   (c) sleep for a predetermined sleep time interval and incrementing the elapsed time variable;
   (d) if the boot state of the second processor executes successfully stop, else continue;
   (e) monitor a current boot state performed by the second processor during the boot sequence and determining if the current boot state is a new boot state, wherein a new boot state is a boot state not in the set of boot states;
   (f) categorize boot states according to execution time and creating sub-states from one or more of states that exceed a predetermined execution time;
   (g) if the current boot state is a new boot state, add the new boot state to the set of boot states and resetting the elapsed time value;
   (h) set the timeout value equal to a user defined value; and
   (i) if the elapsed time is less than the timeout value, loop back to step (c), else if the elapsed time is greater that the timeout value, indicate a failure.

10. The system of claim 9, wherein the timeout variable is set to a predetermined value.

11. The system of claim 9, wherein the timeout variable is associated with a modifiable value.

12. The system of claim 9, wherein the timeout is a user definable variable that is dynamically modifiable by the user.

13. The system of claim 9, wherein the sleep time interval is associated with a sampling rate at which the boot states are monitored.

14. The system of claim 9, further including reporting a second storage processor boot state status to the first storage processor.

15. The system of claim 9, wherein the first storage processor is configured as a primary storage processor and the second storage processor is configured as a secondary storage processor.

16. The system of claim 9, wherein the second storage processor is configured as a primary storage processor and the first storage processor is configured as a secondary storage processor.

17. A non-transitory computer readable medium comprising executable code stored thereon for building a code entity, the non-transitory computer readable medium comprising executable code for:
   (a) providing a first storage processor and a second storage processor of a data storage system, the first storage processor communicatively coupled to the second storage processor, wherein the first storage processor directs the second storage processor to perform one or more boot sequences;
   (b) providing an elapsed time variable, timeout variable, and an empty set of boot states;
   (c) sleeping for a predetermined sleep time interval and incrementing the elapsed time variable;
   (d) if the boot state of the second processor executes successfully stop, else continue;
   (e) monitoring a current boot state performed by the second processor during the boot sequence and determining if the current boot state is a new boot state, wherein a new boot state is a boot state not in the set of boot states;

(f) categorizing boot states according to execution time and creating sub-states from one or more boot states that exceed a predetermined execution time;

(g) if the current boot state is a new boot state, adding the new boot state to the set of boot states and resetting the elapsed time value;

(h) setting the timeout value equal to a user defined value; and (i) if the elapsed time is less than the timeout value, looping back to step (c), else if the elapsed time is greater that the timeout value, indicating a failure.

18. The computer readable medium of claim 17, wherein the timeout variable is associated with a modifiable value.

* * * * *